(12) United States Patent
Rahmouni et al.

(10) Patent No.: US 12,282,131 B2
(45) Date of Patent: Apr. 22, 2025

(54) SYSTEMS AND METHODS FOR INCORPORATING COMPOSITIONAL GRADING INTO BLACK OIL MODELS

(71) Applicant: Saudi Arabian Oil Company, Dhahran (SA)

(72) Inventors: Noureddine Rahmouni, Boumerdes (DZ); Abdullah A. Al-Najem, Dammam (SA); Arshad Hussain, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 898 days.

(21) Appl. No.: 17/335,751

(22) Filed: Jun. 1, 2021

(65) Prior Publication Data

US 2022/0381947 A1 Dec. 1, 2022

(51) Int. Cl.
*G01V 20/00* (2024.01)
*G06F 30/20* (2020.01)

(52) U.S. Cl.
CPC .............. *G01V 20/00* (2024.01); *G06F 30/20* (2020.01)

(58) Field of Classification Search
CPC ................................ G01V 20/00; G06F 30/20
USPC ......................................................... 703/10
See application file for complete search history.

(56) References Cited

U.S. PATENT DOCUMENTS

| | | | | |
|---|---|---|---|---|
| 7,289,943 B2 * | 10/2007 | Barroux | ................... | E21B 4/04 703/2 |
| 7,689,397 B2 * | 3/2010 | Ghorayeb | ............... | E21B 49/00 703/10 |
| 8,180,602 B2 * | 5/2012 | Barboza | .................. | E21B 47/00 703/2 |

(Continued)

FOREIGN PATENT DOCUMENTS

| CN | 106294282 A | 1/2017 |
|---|---|---|
| WO | 20250027766 A1 | 2/2020 |

OTHER PUBLICATIONS

Coats et al. (Compositional and Black Oil Reservoir Simulation, 1998, SPE, pp. 372-379) (Year: 1998).*

(Continued)

*Primary Examiner* — Iftekhar A Khan
(74) *Attorney, Agent, or Firm* — DINSMORE & SHOHL LLP

(57) ABSTRACT

Systems and methods of determining an equivalent black oil model are disclosed. In one embodiment, a method of determining an equivalent black oil model of a reservoir includes generating three-dimensional PVT properties using a compositional model, calculating original fluid in place and reservoir performance characteristics from the three-dimensional PVT properties, and converting the three-dimensional PVT properties to a two-dimensional PVT table. The method further includes, until an equivalency metric is satisfied, generating one or more grouped PVT property tables, initializing a black oil model with the one or more grouped PVT property tables, calculating estimated fluid in (Continued)

place and estimated reservoir performance characteristics using the black oil model, and comparing the estimated fluid in place and the estimated reservoir performance characteristics with the original fluid in place and the reservoir performance characteristics to determine whether the equivalency metric is satisfied.

17 Claims, 11 Drawing Sheets

(56) References Cited

U.S. PATENT DOCUMENTS

| | | | | |
|---|---|---|---|---|
| 10,082,602 | B2* | 9/2018 | Siddiqui | E21B 43/34 |
| 10,387,591 | B2* | 8/2019 | Wong | G01F 1/74 |
| 10,830,041 | B2* | 11/2020 | Fleming | E21B 43/20 |
| 11,840,927 | B2* | 12/2023 | Dogru | G01V 20/00 |
| 2005/0065759 | A1* | 3/2005 | Barroux | E21B 4/04 |
| | | | | 703/10 |
| 2007/0061087 | A1* | 3/2007 | Ghorayeb | E21B 47/10 |
| | | | | 702/30 |
| 2007/0112547 | A1* | 5/2007 | Ghorayeb | G06F 30/20 |
| | | | | 703/10 |
| 2007/0119244 | A1* | 5/2007 | Goodwin | E21B 49/10 |
| | | | | 73/152.28 |
| 2008/0208539 | A1* | 8/2008 | Lee | G01V 1/301 |
| | | | | 703/1 |
| 2008/0234939 | A1* | 9/2008 | Foot | E21B 47/06 |
| | | | | 702/12 |
| 2012/0232859 | A1* | 9/2012 | Pomerantz | G01V 1/282 |
| | | | | 703/2 |
| 2013/0096897 | A1* | 4/2013 | Shahri | G01V 20/00 |
| | | | | 703/10 |
| 2013/0151159 | A1* | 6/2013 | Pomerantz | E21B 49/082 |
| | | | | 702/6 |
| 2013/0197808 | A1* | 8/2013 | Zuo | G06F 17/00 |
| | | | | 702/6 |
| 2014/0200810 | A1* | 7/2014 | Zuo | G06F 30/28 |
| | | | | 702/13 |
| 2015/0081265 | A1* | 3/2015 | Kauerauf | G06F 30/20 |
| | | | | 703/10 |
| 2015/0338550 | A1* | 11/2015 | Wadsley | G06F 17/10 |
| | | | | 703/2 |
| 2016/0259087 | A1* | 9/2016 | Siddiqui | E21B 43/34 |
| 2016/0319640 | A1* | 11/2016 | Ratulowski | G06F 30/20 |
| 2016/0369600 | A1* | 12/2016 | Wong | E21B 47/06 |
| 2016/0369605 | A1* | 12/2016 | Wong | E21B 41/00 |
| 2017/0009558 | A1* | 1/2017 | Wong | E21B 47/07 |
| 2017/0091359 | A1* | 3/2017 | Wong | E21B 43/14 |
| 2018/0112517 | A1* | 4/2018 | Ortíz | E21B 47/06 |
| 2019/0219558 | A1* | 7/2019 | Villar De Andrade E Silva | G01N 33/2823 |
| 2020/0399987 | A1* | 12/2020 | Dabral | E21B 43/00 |
| 2021/0080371 | A1* | 3/2021 | Johns | G01V 20/00 |
| 2021/0165126 | A1* | 6/2021 | Johns | G06F 30/20 |

OTHER PUBLICATIONS

Fevang et al. (Guidelines for Choosing Compositional and Black-Oil Models for Volatile Oil and Gas-Condensate Reservoirs, SPE, 2000, pp. 1-20) (Year: 2000).*

Ceragioli, "Gas Injection: Rigorous Black-Oil or Fast Compositional Model?", International Petroleum Technology Conference, IPTC 12867, pp. 1-10, 2008.

Fevang et al., Guidelines for Choosing Compositional and Black-Oil Models for Volatile Oil and Gas-Condensate Reservoirs, Society of Petroleum Engineers, SPE63087, pp. 1-16, 2000.

Izgec et al., "Performance Analysis of Compositional and Modified Black-Oil Models for a Rich Gas Condensate Reservoir", Society of Petroleum Engineers, SPE93374, pp. 1-14, 2005.

Singh et al., "Generation of Black-Oil PVT Properties Tables Using Tuned EOS Model by Integrating PVT Laboratory Test Datasets", Society of Petroleum Engineers, SPE-175563-MS, pp. 1-12, 2015.

* cited by examiner

| DEPTH_BUBBLE_POINT_TABLE 1 | |
|---|---|
| 6700 | 3505.6 |
| 6750 | 3335.5 |
| 6800 | 3165.4 |
| 6850 | 2995.3 |
| 6900 | 2825.2 |
| 6916 | 2250 |
| 7075 | 2384 |
| 7126 | 2170 |
| 7209 | 1633 |
| 7241 | 1289 |
| 7363 | 910 |
| 7375 | 867 |
| 7390 | 815 |
| 7400 | 777 |
| 7405 | 760 |
| 7431 | 668 |
| 7460 | 566 |
| 7480 | 495 |
| 7500 | 422 |
| 7550 | 244 |

SYSTEMS AND METHODS FOR INCORPORATING COMPOSITIONAL GRADING INTO BLACK OIL MODELS

BACKGROUND

Oil and gas companies rely on computer models to estimate information regarding hydrocarbon reservoirs, such as volumes of the reservoir. One such model is a fully compositional model that takes into account many components, such as different hydrocarbons, water, and the like. Compositional models further account for compositional variation with depth in the reservoir. Although highly accurate, calculations using compositional models are computationally expensive and may take many hours to complete (e.g., ten hours or more).

Another more simplified model is a black oil model. Black oil tables are generally extracted using a tuned multi-component Equation of State model using valid oil sample (s). This process provides an approximate estimation of the fluid properties of the reservoir, and hence the fluid in place of the reservoir, as compared to a fully compositional model. In conventional black oil models with compositional gradient, the variations in the oil pressure-volume-temperature (PVT) properties is handled by imposing a depth versus saturation pressure (PSAT) or depth versus solution gas ratio (RS/rs). However, in high compositional variation reservoirs, the black oil model method may result in larger volume differences, thereby impacting the field performance.

Accordingly, alternative systems and methods for estimating fluid properties of a reservoir that are computationally inexpensive and accurately account for compositional grading are desired.

SUMMARY

Embodiments of the present disclosure are directed to systems and methods for determining an equivalent black oil model for use in reservoir production planning. In embodiments, equivalent black oil properties are extracted from a fully compositional simulation model. These equivalent black oil properties are inputted into a black oil model. Volumetric properties of the black oil model are compared against volumetric properties calculated by the fully compositional simulation model. The equivalent black oil model is revised until an equivalency metric is satisfied. Once the equivalency metric is satisfied, the equivalent black oil model is approved and may be used in downstream processes to evaluate the reservoir.

In one embodiment, a method of determining an equivalent black oil model of a reservoir includes generating three-dimensional pressure-volume-temperature (PVT) properties using a compositional model, calculating original fluid in place and reservoir performance characteristics from the three-dimensional PVT properties, and converting the three-dimensional PVT properties to a two-dimensional PVT table. The method further includes, until an equivalency metric is satisfied, generating one or more grouped PVT property tables, wherein each grouped PVT property table corresponds with an area of the reservoir having similar PVT properties of the two-dimensional PVT table, initializing a black oil model with the one or more grouped PVT property tables, calculating estimated fluid in place and estimated reservoir performance characteristics using the black oil model, and comparing the estimated fluid in place and the estimated reservoir performance characteristics with the original fluid in place and the reservoir performance characteristics, respectively, to determine whether the equivalency metric is satisfied. When the equivalency metric is satisfied, the method further includes approving the black oil model as the equivalent black oil model.

In another embodiment, a method of determining an equivalent black oil model of a reservoir includes extracting a plurality of fluid samples from a plurality of depths of the reservoir, generating a plurality of trend equations for a plurality of components varying with depth, and generating three-dimensional pressure-volume-temperature (PVT) properties using a compositional model by initializing the compositional model with at least the plurality of trend equations and an Equation of State model calibrated from properties of the plurality of fluid samples. The method also includes calculating original fluid in place and reservoir performance characteristics from the three-dimensional PVT properties, converting the three-dimensional PVT properties to a two-dimensional PVT table, and generating one or more grouped PVT property tables, wherein each grouped PVT property table corresponds with an area of the reservoir having similar PVT properties of the two-dimensional PVT table. The method further includes initializing a black oil model with the one or more grouped PVT property tables, calculating estimated fluid in place and estimated reservoir performance characteristics, comparing the estimated fluid in place and the estimated reservoir performance characteristics with the original fluid in place and the reservoir performance characteristics, respectively, to determine whether a equivalency metric is satisfied. When the equivalency metric is satisfied, the method includes approving the black oil model as the equivalent black oil model. When the equivalency metric is not satisfied, the method includes re-grouping the one or more grouped PVT property tables, initializing the black oil model with re-grouped one or grouped PVT property tables, and calculating updated estimated fluid in place and updated estimated reservoir performance characteristics until the equivalency metric is satisfied.

In yet another embodiment, a system of determining an equivalent black oil model of a reservoir includes one or more processors and a non-transitory computer-readable memory storing instructions. When executed by the one or more processors, the instructions cause the one or more processors to generate three-dimensional pressure-volume-temperature (PVT) properties using a compositional model, calculate original fluid in place and reservoir performance characteristics from the three-dimensional PVT properties and convert the three-dimensional PVT properties to a two-dimensional PVT table. The instructions further cause the one or more processors to, until an equivalency metric is satisfied, generate one or more grouped PVT property tables, wherein each grouped PVT property table corresponds with an area of the reservoir having similar PVT properties of the two-dimensional PVT table, initialize a black oil model with the one or more grouped PVT property tables, calculate estimated fluid in place and estimated reservoir performance characteristics using the black oil model, and compare the estimated fluid in place and the estimated reservoir performance characteristics with the original fluid in place and the reservoir performance characteristics, respectively, to determine whether the equivalency metric is satisfied. When the equivalency metric is satisfied, the instructions cause the one or more processors to approve the black oil model as the equivalent black oil model.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
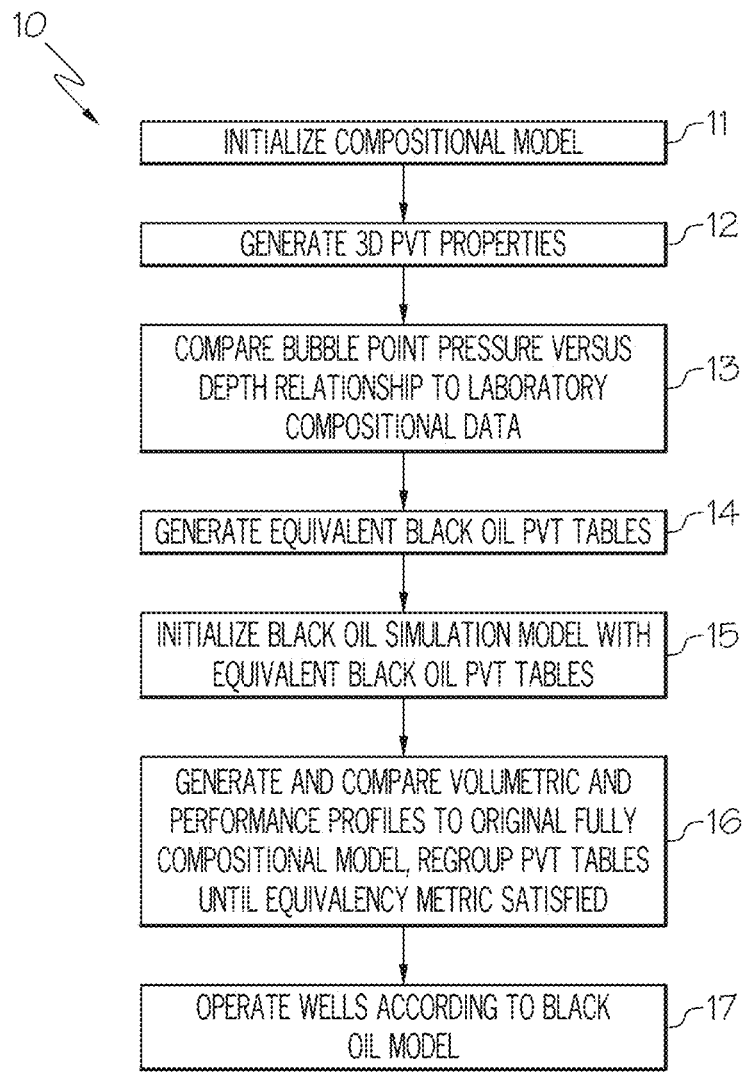
FIG. 1 schematically illustrates a flowchart of an example process for determining an equivalent black oil model of a reservoir according to one or more embodiments described and illustrated herein.

Embodiments of the present disclosure are directed to systems and methods for creating equivalent black oil models for operating wells of a reservoir that incorporate compositional grading. The equivalent black oil models that are created account for reservoirs with compositional gradient, provide the high accuracy of fully compositional models, and require the much lower computational resources of the black oil model method as compared with the fully compositional model method.

Generally, embodiments provide for a consistent black oil model initialization with a compositional gradient workflow. In embodiments, equivalent black oil properties (also referred to herein as "equivalent black oil PVT properties" or "equivalent PVT properties") are extracted from a fully compositional simulation model (also referred to herein as a "compositional simulation model" or a "compositional model"). These equivalent black oil properties are inputted into a black oil model. Volumetric properties of the black oil model are compared against volumetric properties calculated by the fully compositional simulation model. The equivalent black oil model is revised until an equivalency metric is satisfied. Once the equivalency metric is satisfied, the equivalent black oil model is approved and may be used in downstream processes to evaluate the reservoir. Thus, the fully compositional simulation model need only be run once, and from there on an equivalent black oil model that accounts for compositional gradient reservoirs may be utilized. This significantly reduces the computing power and time required by a fully compositional model to estimate reservoir properties.

Referring to the flowchart 10 of FIG. 1, and as described in detail below, a non-limiting and example general workflow of embodiments of the present disclosure is as follows:

Initialize a compositional model using an EoS model with extended components of the reservoir fluid (block 11).

Generate three-dimensional pressure-volume-temperature (PVT) properties distribution, directly from the compositional model output (block 12).

Compare one or more properties (e.g., bubble point pressure versus depth relationship) to laboratory compositional data derived from reservoir samples (block 13).

Identify relationship between bubble point pressure and fluid properties to generate equivalent black oil PVT tables (block 14).

Initialize a black oil simulation model with equivalent PVT property tables (e.g., PSAT/RS versus depth and PVT properties versus pressure) extracted from the compositional model (block 15).

Generate and compare the volumetric and performance profiles to the original fully compositional model to determine if an equivalency metric is satisfied. Regroup PVT properties by region, and generate and compare the volumetric and performance profiles to the original fully compositional model until the equivalency metric is satisfied (block 16).

Accept equivalent black oil model and operate wells according to the equivalent black oil model.

The above-workflow was tested in multi-million simulation oil models with wide fluid compositional variations, and remarkably helped to obtain accurate and consistent fluid in place volumes and closely matched performance profiles of the parent compositional model. Therefore, the equivalent black oil model of the present disclosure has significantly improved the accuracy of reservoirs with high fluid compositional variation with no extra computational resources.

Figure 2:
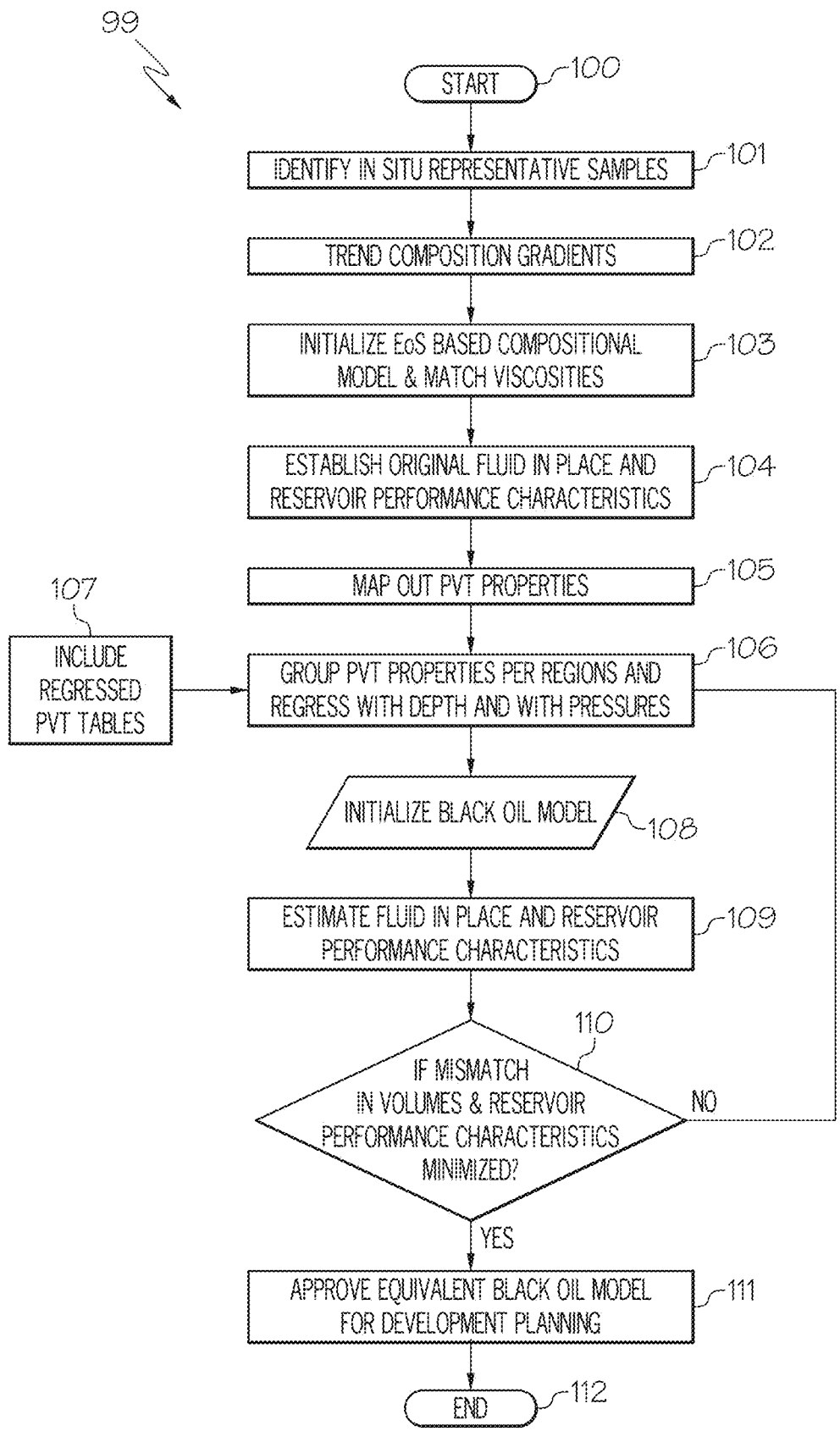
FIG. 2 schematically illustrates a flowchart of another example process for determining an equivalent black oil model of a reservoir according to one or more embodiments described and illustrated herein.

Referring now to FIG. 2, a more detailed flowchart 99 of the non-limiting example workflow 10 shown in FIG. 1 according to embodiments of the present disclosure is graphically illustrated. It should be understood that embodiments are not limited by the order or number of steps in the flowcharts 10, 99 and FIGS. 1 and 2, respectively.

The workflow starts at block 100, where it may be determined that a reservoir should be evaluated by simulation. At block 101, in-situ representative samples of the reservoir at various depths are obtained. More particularly, a comprehensive set of reservoir fluid samples are selected using conventional quality control procedures. Valid samples are used to build reservoir fluid phase behavior model. An Equation of State (EoS) model is calibrated to the available experimental data from the samples. The experimental data may include, but is not limited to, depletion liberation experiment (DLE), constant composition experiment (CCE), and multi stage separator test experiment (flash experiment) with relative volume and fluid surface densities.

Next, at block 102, it is determined how the composition of the PVT properties vary with depth. Thus, in-situ representative samples are identified for depth variation of composition. In this step, a composition grading relationship is established using composition at corresponding interval depths and ensuring the entire reservoir interval is covered. To achieve this, the method plots component versus depth to show component trend with depth. A trend equation is fit for each component to the plot of the particular component versus depth.

The calibrated EoS model and the trend equations, for fluid composition variation with depth, are used to initialize a fully compositional model at block 103 (also see block 11 of FIG. 1). Any known or yet-to-be-developed fully compositional model may be utilized. In some embodiments, at block 103, a viscosity model of the fully compositional model is tuned according to experiment PVT data. For example, the method may include tuning viscosity parameters from the EoS model, and adjusting parameters of the EoS model to correlate calculated viscosity of the EoS model with measured viscosity of the plurality of fluid samples. As a non-limiting example, the correlation of the calculated viscosity and the measured viscosity is performed by Lorenz-Bray-Clark (LBC) correlation, which provides simplicity, consistency and flexibility. Tuning of the LBC parameters is performed using regression to match the simulated viscosity with measured viscosity data by modifying primarily critical volume of C35+ components. The final LCB parameters are used in block 104.

At block 104, the fully compositional model utilizes the EoS model, the one or more trend equations, and the LCB parameters providing viscosity matching to generate three dimensional PVT properties of the reservoir, as well as calculating original fluid in place and reservoir performance characteristics from the three-dimensional PVT properties. At this step, the model is initialized with the EoS model (e.g., 41 components) and by imposing composition variation with depth by way of the one or more trend equations, and tuned LBC parameters from block 103.

First, the fully compositional model is run with zero production to calculate the initial PVT properties variation with depth (e.g., bubble point, formation volume factors, solution gas oil ratio, and phase viscosities). The fully compositional model then estimates the original fluid in place (i.e., the original oil and original gas in place).

Next, the fully compositional model is run over an extended period under a pressure depletion strategy from the original pressure to the reservoir abandonment pressure, incorporating operational constraints, to generate field and wells production profiles (e.g., oil, gas and water rates and volumes with time) and PVT properties variation with pressure (e.g., formation volume factors, solution gas oil ratio, phase viscosities, oil compressibility, and oil viscosibility). Both the production profiles and the PVT properties variation with pressure are collectively referred to herein as reservoir performance characteristics.

The process then moves to block 105, where initial recurrent fluids PVT properties are mapped out in the compositional model. In this step, each property is output in three dimensions (e.g., formation oil factor, gas oil ratio and oil bubble point pressure), which will be used in block 106. In this step, equivalent black oil properties are calculated as a function of pressure for each depth in the reservoir.

In block 106, the process then groups the three-dimensional mapped output PVT properties from the fully compositional model generated by similar PVT or equilibrium regions. Therefore, the reservoir is divided into sections or groups by similar PVT values. For example, a model may have one million three-dimensional cells. The modeled reservoir may have one type of composition at a shallow depth and another type of composition at a deeper depth. In this example, the shallow depth is assigned a first group and the deeper depth is assigned a second group. Grouping may also be applied laterally across X-Y directions, for example. In some cases, there may only be one group for the entire reservoir. Any number of groups may be created.

Within each PVT region or equilibrium group, a relationship of PVT properties versus depth is established. The PVT properties may include, without limitation, saturation pressure (bubble point pressure or dew point pressure), solution gas oil ratio (RS) for oil zone or oil gas ratio (rs) for the gas zone), formation volume factor, and viscosity. PVT tables including these PVT properties will be used to initialize the equivalent black oil model and correct compositional variation within each PVT group.

Additionally, pressure dependent PVT properties are calculated for black oil model initialization including, without limitation, solution gas ratio (rs), formation volume factors (oil, gas and water), viscosities, bubble point and API oil gravity.

Figure 3A:
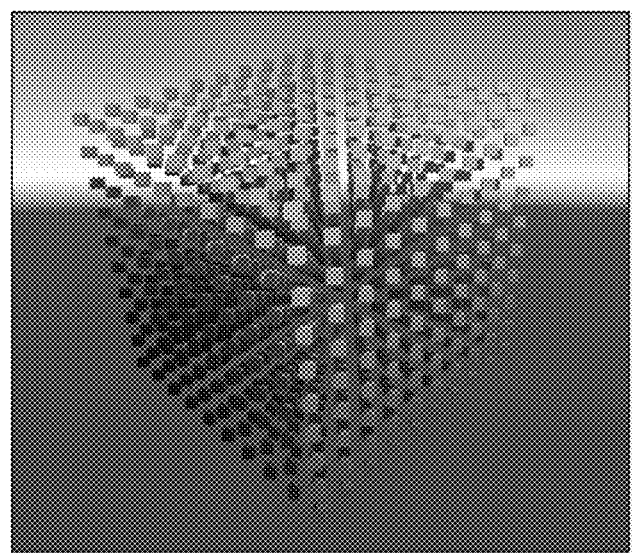
FIG. 3A graphically illustrates a three-dimensional array of bubble point at zero production according to one or more embodiments described and illustrated herein.
Figure 3B:
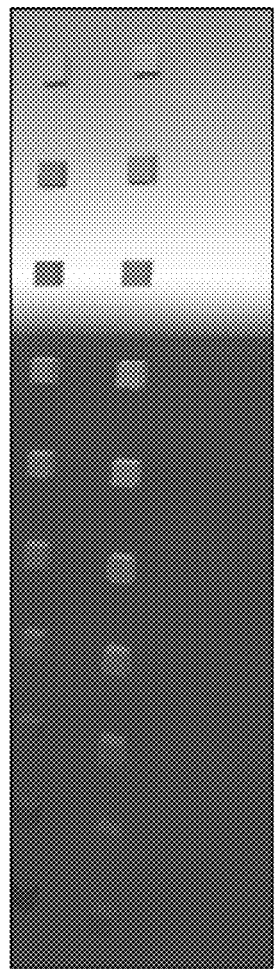
FIG. 3B graphically illustrates a two-dimensional table of bubble point versus depth from zero production according to one or more embodiments described and illustrated herein.

These three-dimensional PVT properties that are produced by the compositional model are then converted into two-dimensional tables by applying a matrix reshaping technique, for example. There may be one PVT property table for each PVT property in a group. FIG. 3A graphically illustrates a three-dimensional array of the PVT property bubble point at zero production (i.e., a first time step of the model) that is derived from the fully compositional model. FIG. 3B illustrates a table of bubble point versus depth from zero production. In the table of FIG. 3B, the average bubble point of the reservoir is taken at each depth.

Figure 4:
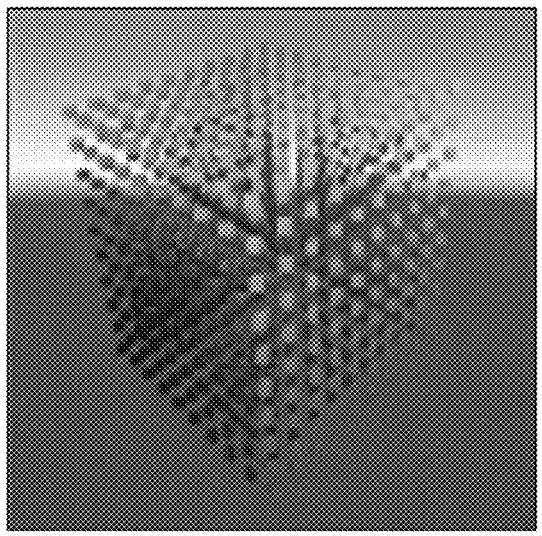
FIG. 4 graphically illustrates three three-dimensional property arrays for three time steps, and thus three pressures according to one or more embodiments described and illustrated herein.
Figure 4:
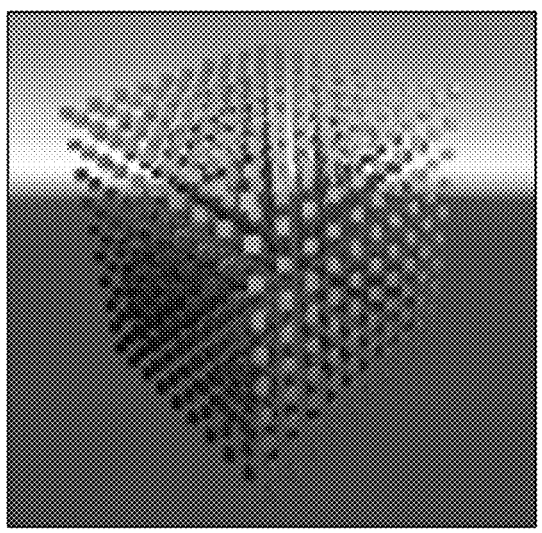
Figure 4:
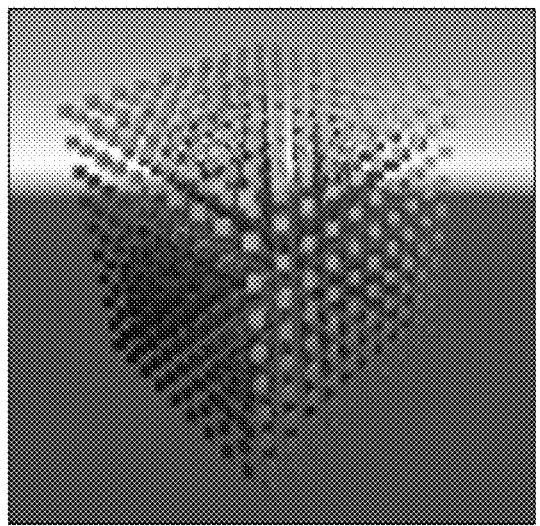

FIG. 4 graphically illustrates a three three-dimensional property array for three time steps, and thus three pressures. For example, the bottom array is a first time/pressure step, the middle array is a second time/pressure step, and the top array is a third time/pressure step. Any number of steps may be provided. The three-dimensional arrays may be converted into two-dimensional tables. For example, an average PVT property for the entire three-dimensional array for the particular time/pressure steps may be calculated. These values are then stored in a table that provides a PVT property at a plurality of pressures.

Any number of PVT properties may be converted to two-dimensional PVT tables, such as, without limitation, formation volume factor, solution gas ratio, viscosity, bubble pressure, and the like.

Referring once again to FIG. 2, at block 109 the regressed PVT tables 107 created at block 106 are used to initialize a black oil model. As a non-limiting example, the regressed PVT tables may include saturation tables with depth and black oil PVT tables with pressure.

The black oil model is used to calculate an estimated fluid in place and estimated reservoir performance characteristics at block 110. The estimated fluid in place include oil in place and gas in place. The estimated reservoir performance characteristics include PVT properties variation with depth and PVT properties variation with pressure.

At block 110, the estimated fluid in place outputted by the black oil model is compared with the original fluid in place outputted by the compositional model, and the estimated reservoir performance characteristics outputted by the black oil model is compared with the reservoir performance characteristics to determine if an equivalency metric is satisfied. The equivalency metric is provided to show how similar the output of the black oil model is to the output of the compositional model. As a non-limiting example, the equivalency metric is satisfied when the estimated fluid place is within defined limits of the original fluid in place and/or one or more estimated reservoir performance characteristics is within defined limits of the reservoir performance characteristics. For example, the predefined limits may be a percent difference between the estimated value and the value of the compositional model (e.g., 25%, 20%, 15%, 10%, 5%, 3% or 1%). Embodiments are not limited by the defined limit, which may be set by the user.

When the equivalency metric is satisfied, it means that the mismatch between in the volumes and depletion is minimized, and the process moves to block 111, where the black oil model is approved as an equivalent black oil model that may be used for reservoir development planned. The process then ends at block 112, where wells may be operated based on the equivalent black oil model and development plans.

When the equivalency metric is not satisfied, the process goes back to block 106, where the PVT properties are regrouped in order to more closely align the equivalent black oil model with the compositional model in subsequent calculations and comparisons. More PVT groups may be defined, PVT groups may be eliminated, and/or PVT group boundaries may be modified.

The workflow of FIG. 2 was tested in multi-million simulation oil models and remarkably helped to obtain accurate and consistent fluid in place volumes and matched performance parameters of a black oil model compared to its parent compositional model. FIGS. 5A-5G below illustrate results comparisons of the original compositional model and the equivalent black oil model of an oil bearing reservoir with low gas oil ratio exhibiting compositional gradient. Both models, compositional and equivalent black oil, are initialized using the same EoS model used to generate black oil PVT tables, and separator conditions are set as the same in both models. Compositional gradient is implemented in the equivalent black oil model as bubble point variation with depth table and as composition variation (41 components) with depth in the EoS model.

Figure 5A:
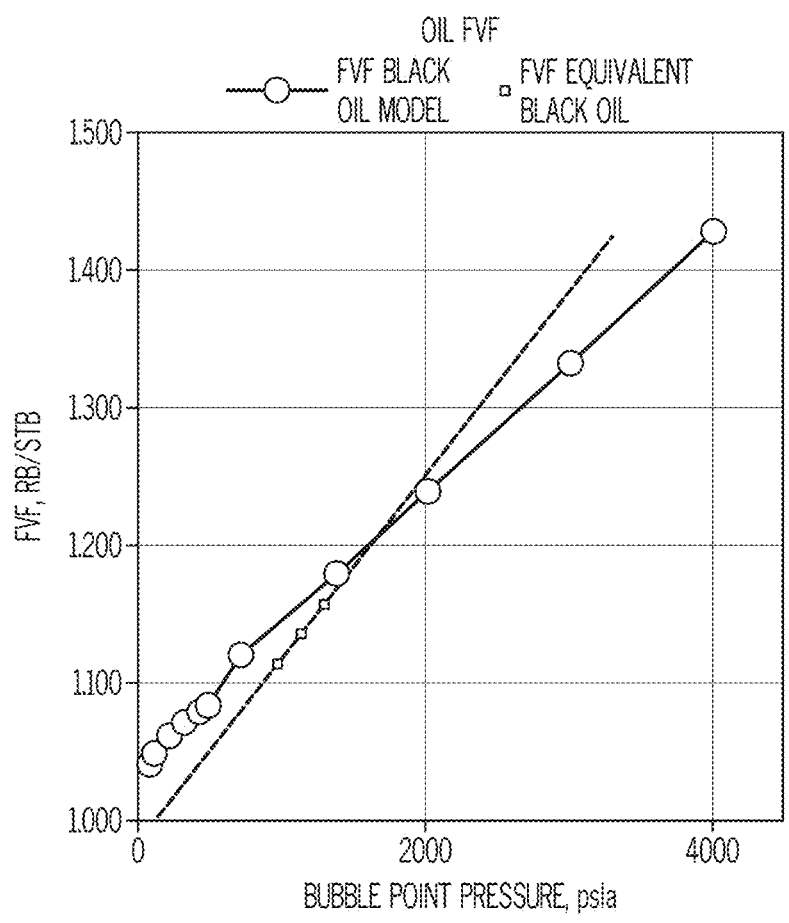
FIG. 5A graphically illustrates plots of formation volume factor versus bubble point pressure for an equivalent black oil model and a black oil model according to one or more embodiments described and illustrated herein.

FIG. 5A plots formation volume factor (FVF) versus bubble point pressure for an equivalent black oil table created by the workflow of FIG. 2 and a traditional black oil model that does not account for compositional gradient. As shown, the two plots are different, thereby indicating that the workflow of FIG. 2 and accounting for compositional gradient has an impact on the model.

Figure 5B:
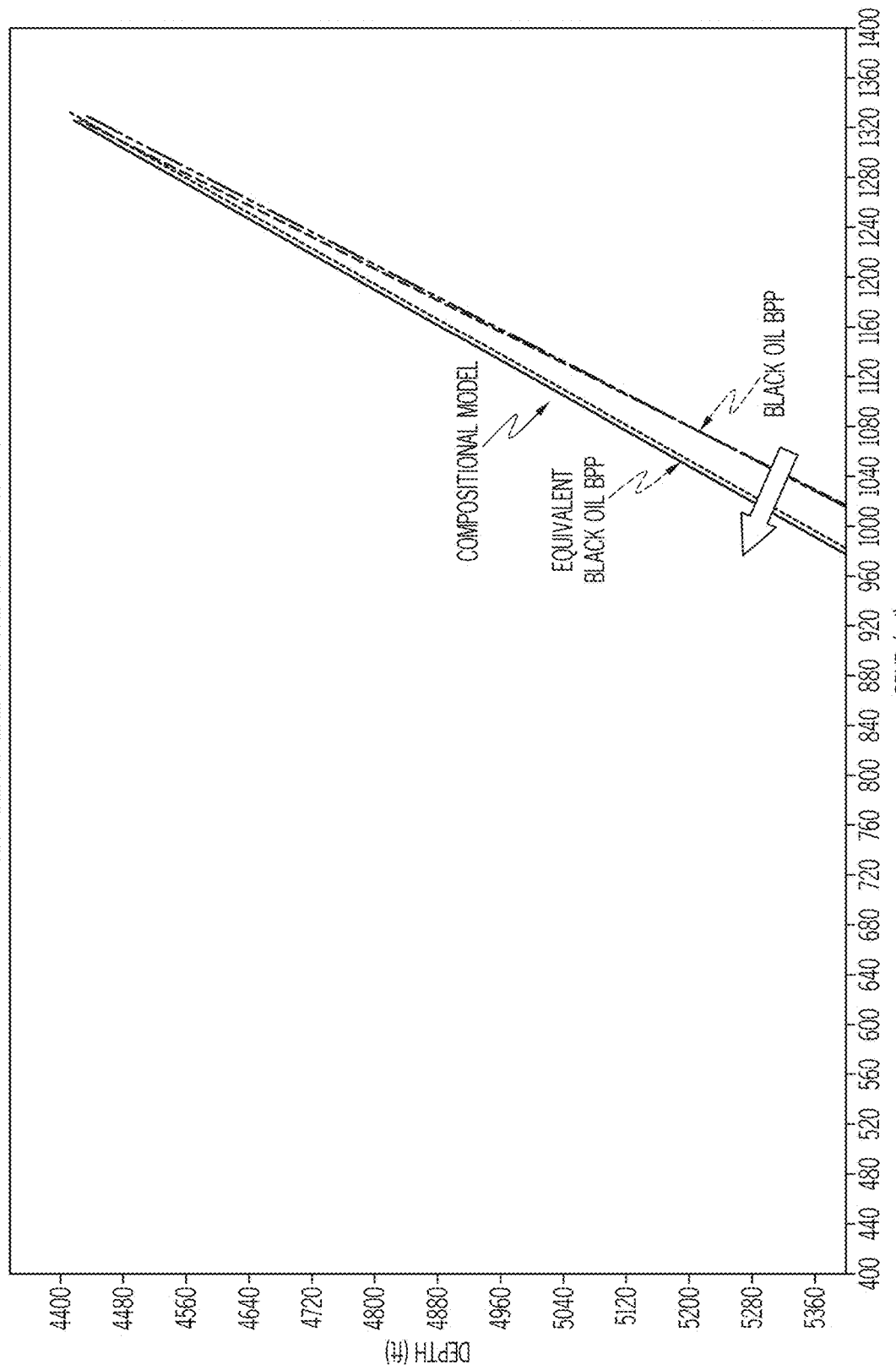
FIG. 5B graphically illustrates plots of initialized bubble point pressure variation with depth for a compositional model, a black oil model, and an equivalent black oil model according to one or more embodiments described and illustrated herein.

FIG. 5B plots initialized bubble point pressure variation with depth from a compositional model compared to black oil and equivalent black oil models. The equivalent black oil curve overlaps the compositional model curve. Deviation in initialized bubble point versus depth is between the compositional model and the black oil model is due to the fact that in the compositional model, fluid properties are calculated as composition changes with depth and pressures. The equivalent black model accounts for composition changes with depth and pressures as well. However, in the black oil model, the PVT properties generated using multi-component EoS are calculated using a single PVT sample and compositional variation with depth is imposed using a look up table. The remaining PVT tables are estimated using a constant surface oil and gas densities which would flag a degree of accuracy and will then impact performance behavior.

The error in initial oil and gas in place for the traditional black oil model with reference to the compositional model is estimated at −1.4% and +5% respectively. It is clear that the difference in gas in place is significant and may impact history match and performance because of variation in fluid mobilities and in driving mechanism (solution gas drive, and fluid compressibilities). For oil in place, although the difference is small in terms of percentage but in absolute value it may be significant. Reservoir performance in this example is almost similar due to the fact that reservoir is operated above bubble point and no changes in the phase behavior beside the initial fluid in place are reported. However, it is expected to see significant differences in the initial fluid distribution and performance parameters when the reservoir pressure drops below bubble point pressure or in reservoirs where compositional variation is more significant such as volatile oil or gas condensate.

The differences are remarkably reduced when using the equivalent black oil approach of the present disclosure. By using corrected PVT tables, initialized equivalent black oil improved results when compared to the compositional model. Initial oil in place difference were reduced from −1.4% to +0.1%, and difference in solution gas in place reduced from +5% to +0.2%. These are significant improvements and show that the equivalent black oil models of the present disclosure provide similar performance to the compositional model with much less computational resources.

Figure 5C:
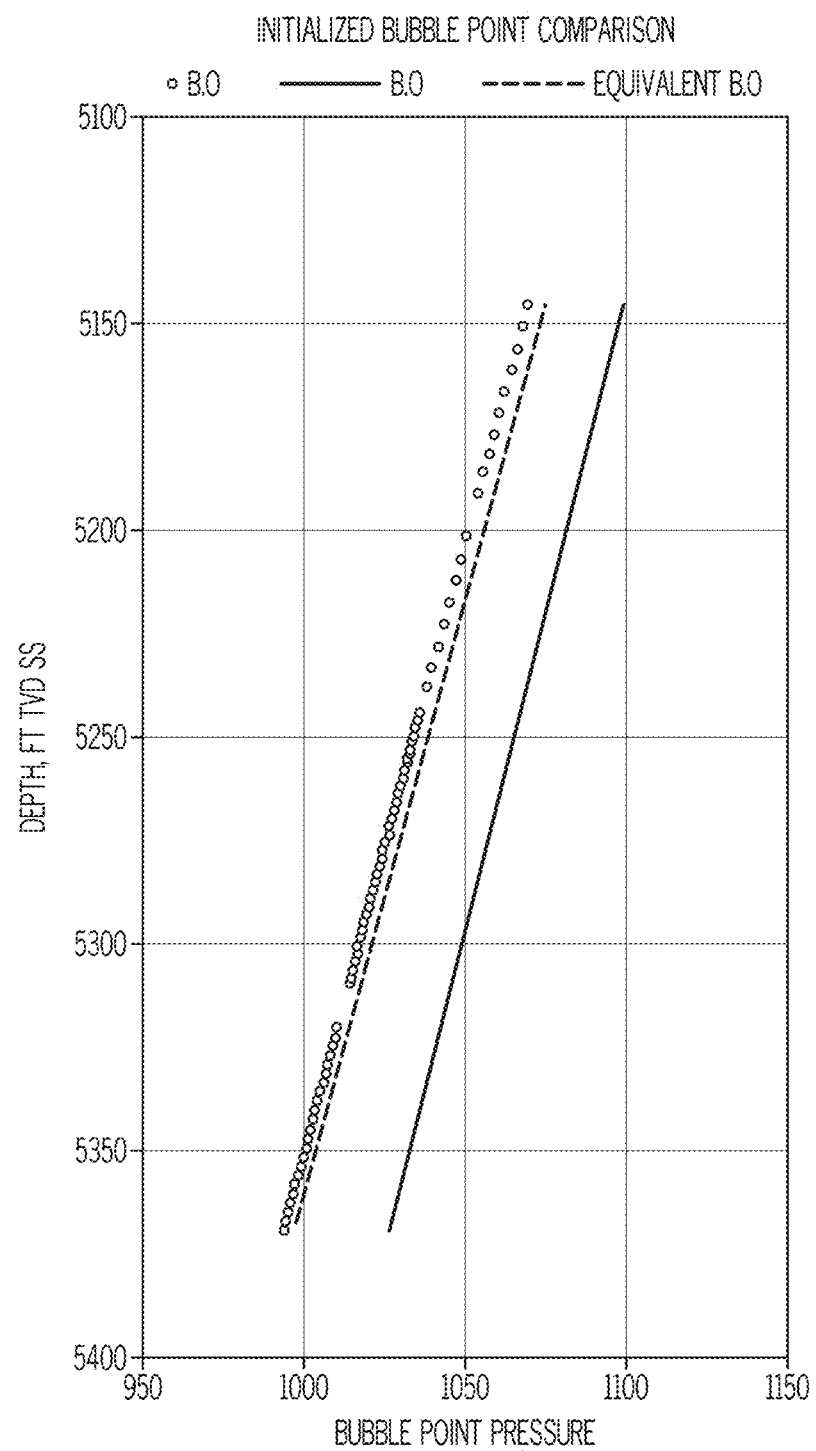
FIG. 5C graphically illustrates initialized bubble point versus depth plots of an oilfield from a compositional model for a selected well compared to a black oil model initialized using original and equivalent black oil tables model according to one or more embodiments described and illustrated herein.

FIG. 5C graphically illustrates initialized bubble point versus depth plots of an oilfield from a compositional model for a selected well compared to a black oil model initialized using original and equivalent black oil tables model. As shown, the black oil model initialized with equivalent black oil tables track much more closely with the compositional model (EOS) than the black oil model initialized with original black oil tables.

Figure 5D:
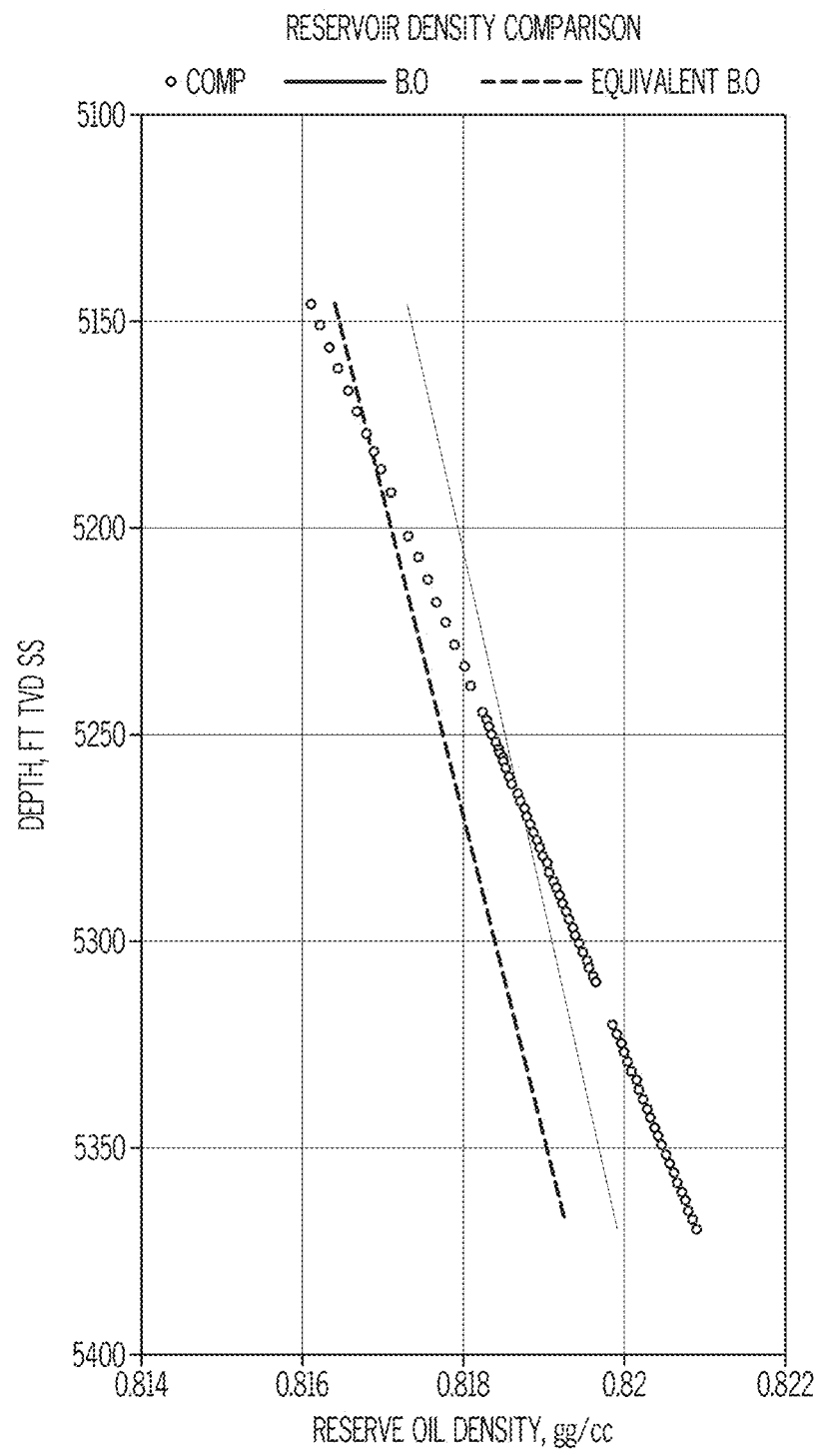
FIG. 5D graphically illustrates reservoir oil density versus depth plots of an oilfield from initialized oil density output for a compositional model for a selected well compared to a black oil model initialized using original and equivalent black oil tables according to one or more embodiments described and illustrated herein.

FIG. 5D illustrates reservoir oil density versus depth plots of an oilfield from initialized oil density output for a compositional model for a selected well compared to a black oil model initialized using original and equivalent black oil tables.

Figure 5E:
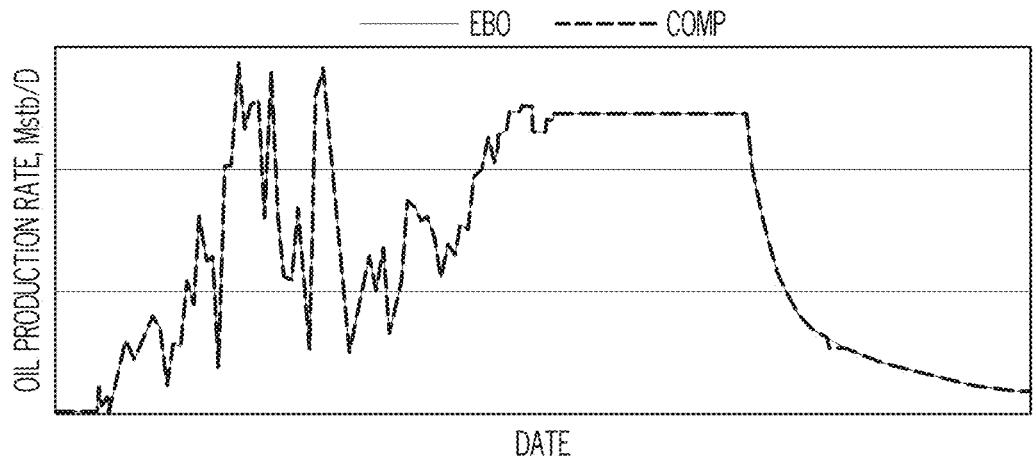
FIG. 5E graphically illustrates normalized field oil production rate plots of an oilfield for outputs of a compositional model compared to an equivalent black oil model initialized with an equivalent black oil PVT tables according to one or more embodiments described and illustrated herein.
Figure 5F:
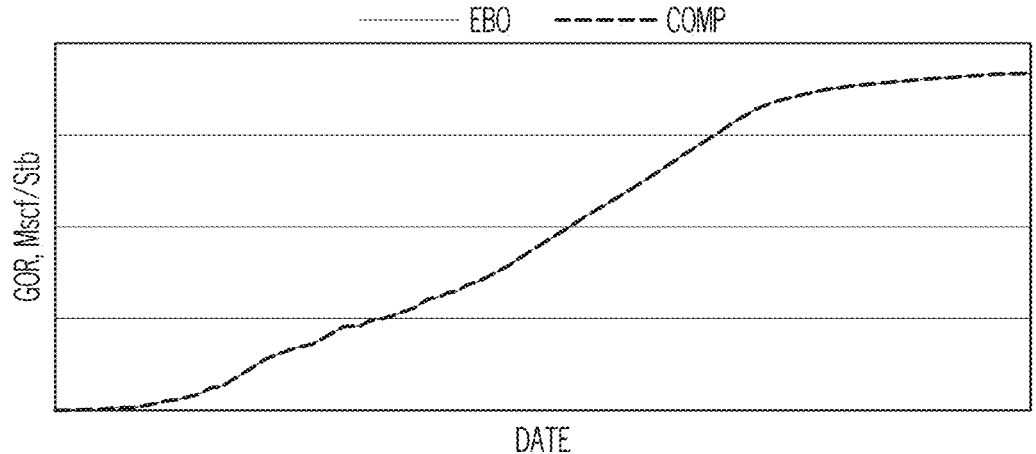
FIG. 5F graphically illustrates normalized field cumulative oil production rate plots for outputs of a compositional model compared to a black oil model initialized with equivalent black oil PVT tables according to one or more embodiments described and illustrated herein.

FIG. 5E illustrates normalized field oil production rate plots of an oilfield for outputs of a compositional model compared to an equivalent black oil model initialized with equivalent black oil PVT tables. As shown, the normalized field oil production of the equivalent black oil model tracks the compositional model. FIG. 5F illustrates normalized field cumulative oil production rate plots for outputs of a compositional model compared to a black oil model initialized with equivalent black oil PVT tables.

Figure 5G:
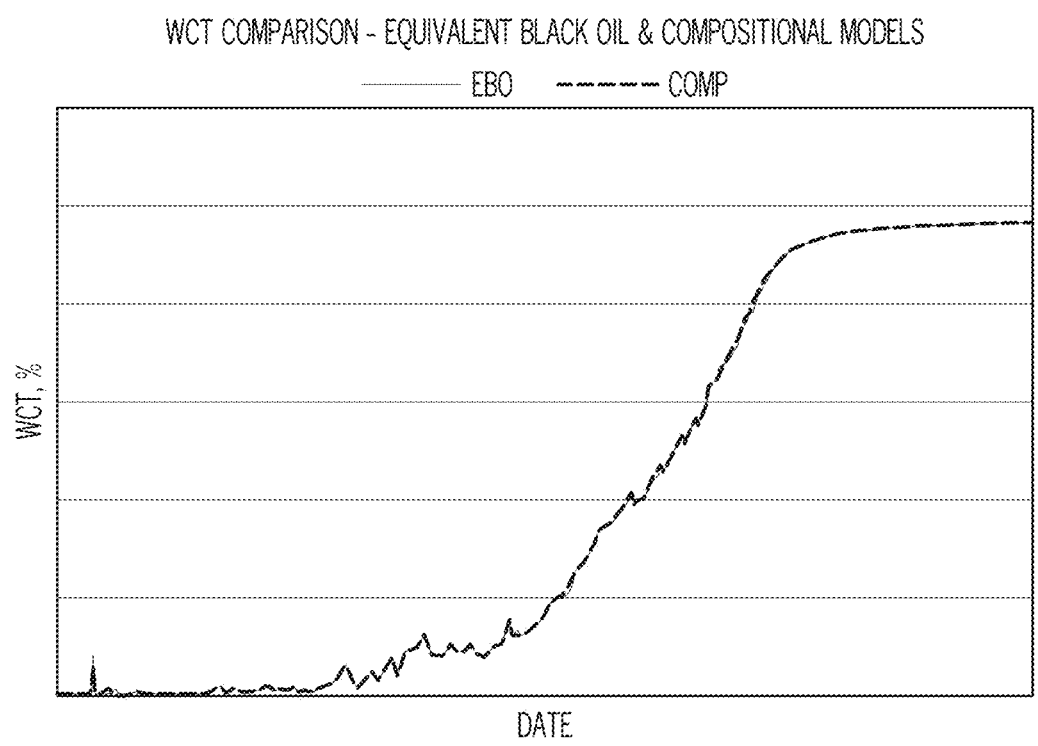
FIG. 5G graphically illustrates normalized field water cut oil production rate for outputs of a compositional model compared to a black oil model initialized with equivalent black oil PVT tables according to one or more embodiments described and illustrated herein.

FIG. 5G graphically illustrates normalized field water cut oil production rate for outputs of a compositional model compared to a black oil model initialized with equivalent black oil PVT tables. As shown, the normalized field water cut oil production of the equivalent black oil model tracks the compositional model.

Figure 6:
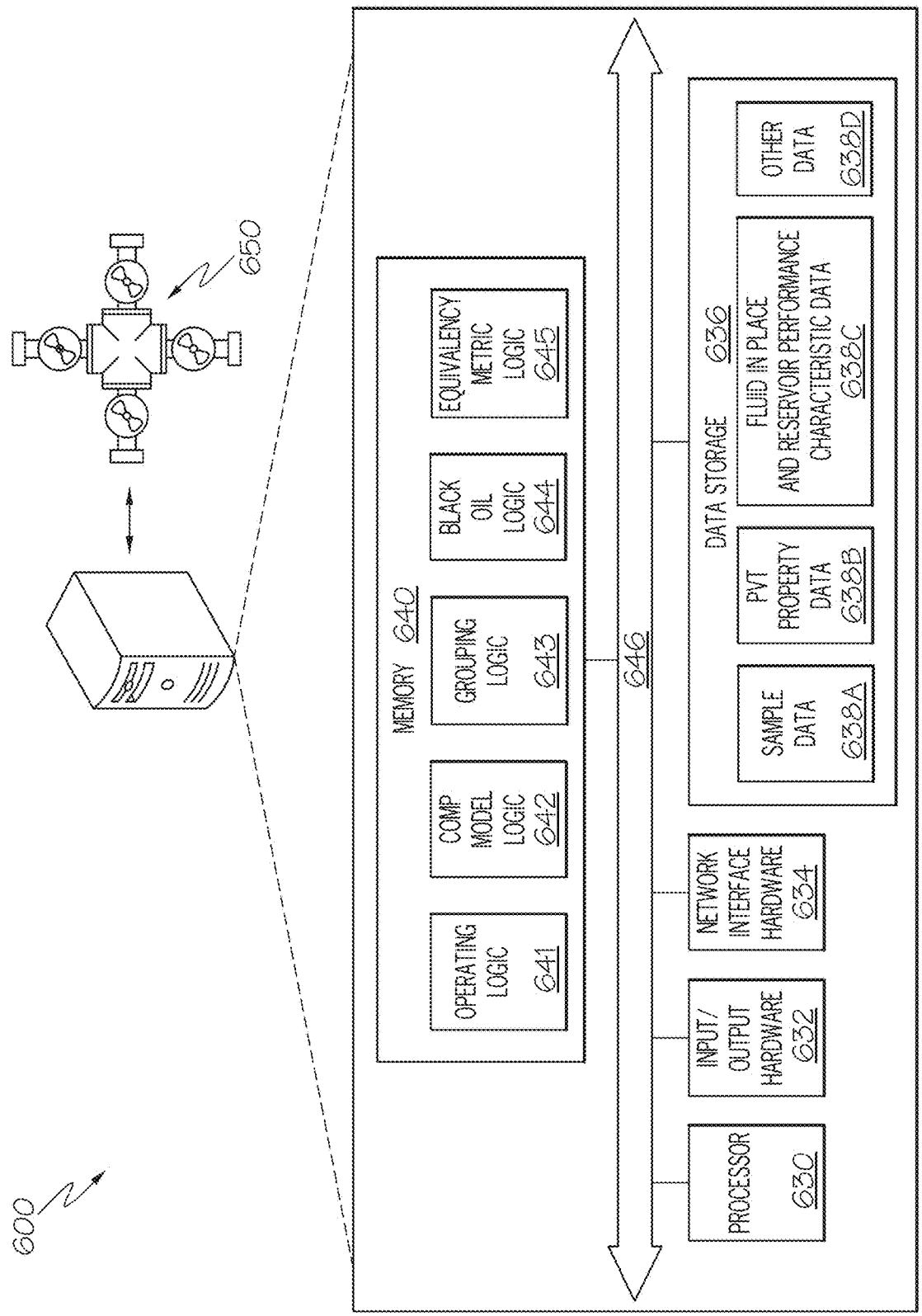
FIG. 6 schematically illustrates an example computer system for performing the methods described herein according to one or more embodiments described and illustrated herein.

Embodiments of the present disclosure may be implemented by a computing device, and may be embodied as computer-readable instructions stored on a non-transitory memory device. FIG. 6 depicts an example computing device 600 configured to perform the functionalities described herein. The example computing device 600 provides a system for determining an equivalent black oil model of a reservoir, and/or a non-transitory computer-usable medium having computer readable program code for determining an equivalent black oil model of a reservoir embodied as hardware, software, and/or firmware, according to embodiments shown and described herein. While in some embodiments, the computing device 600 may be configured as a general purpose computer with the requisite hardware, software, and/or firmware. In some embodiments, the computing device 600 may be configured as a special purpose computer designed specifically for performing the functionalities described herein. It should be understood that the software, hardware, and/or firmware components depicted in FIG. 6 may also be provided in other computing devices external to the computing device 600 (e.g., data storage devices, remote server computing devices, and the like).

As also illustrated in FIG. 6, the computing device 600 (or other additional computing devices) may include a processor 630, input/output hardware 632, network interface hardware 634, a data storage component 636 (which may sample data 638A, PVT property data 638B (both three-dimensional and two-dimensional tables)), fluid in place and reservoir performance characteristic data 638C (both compositional and equivalent black oil models) and any other data 638D), and a non-transitory memory component 640. The memory component 640 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 640 may be configured to store operating logic 641, compositional model logic 642, grouping logic 643, black oil model logic 644, and equivalency metric logic 645 (each of which may be embodied as computer readable program code, firmware, or hardware, as an example). A local interface 646 is also included in FIG. 6 and may be implemented as a bus or other interface to facilitate communication among the components of the computing device 600.

The processor 630 may include any processing component configured to receive and execute computer readable code instructions (such as from the data storage component 636 and/or memory component 640). The input/output hardware 632 may include an electronic display device, keyboard, mouse, printer, camera, microphone, speaker, touchscreen, and/or other device for receiving, sending, and/or presenting data. The network interface hardware 634 may include any wired or wireless networking hardware, such as a modem, LAN port, wireless fidelity (Wi-Fi) card, WiMax card, mobile communications hardware, and/or other hardware for communicating with other networks and/or devices, such as external devices for operating well components 650 (e.g., valves) in accordance with the equivalent black oil model.

It should be understood that the data storage component 636 may reside local to and/or remote from the computing device 600, and may be configured to store one or more pieces of data for access by the computing device 600 and/or other components. As illustrated in FIG. 6, the data storage component 636 may include sample data 638A, which in at least one embodiment includes data regarding oil samples taken from a reservoir. Similarly, PVT property data 638B may be stored by the data storage component 636 and may include three-dimensional and two-dimensional PVT table data. Fluid in place and reservoir performance characteristic data 638C may include original fluid in place data, reservoir performance characteristic data, estimated fluid in place data, and estimated reservoir performance characteristic data. Other data 638D to perform the functionalities described herein may also be stored in the data storage component 636.

Included in the memory component 640 may be the operating logic 641, compositional model logic 642, grouping logic 643, black oil model logic 644, and equivalency metric logic 645. The operating logic 641 may include an operating system and/or other software for managing components of the computing device 600. Similarly, compositional logic 642 may reside in the memory component 640 (or some other remote computing device) and is configured to perform compositional model functionalities, such as calculating PVT properties, fluid in place, and reservoir performance characteristics. The grouping logic 643 is configured to create groups within the reservoir based on similar PVT properties. The black oil model logic 644 is configured to receive PVT properties from the compositional model logic 642 and generate the estimated fluid in place and the estimated reservoir performance characteristics. The equivalency metric logic 645 is configured to compare the original fluid in place with the estimated fluid and place, compare the reservoir performance characteristics with the estimated reservoir performance characteristics, and determine if the equivalency metric is satisfied.

It should now be understood that embodiments of the present disclosure are directed to systems and methods for determining an equivalent black oil model that incorporates compositional grading. Conventionally, reservoirs exhibiting compositional gradient are initialized using PVT tables generated from a tuned EoS model and an imposed compositional gradient model. This approach is an approximation that leads to differences in the initialized fluid properties hence in the initial volumes and reservoir performance when compared to reference compositional model. These differences become larger when dealing with reservoirs exhibiting high compositional variation such as volatile oil and gas condensate. Embodiments of the present disclosure capture the complexity of fluid flow characterization and minimizes differences caused by conventional approach approximation by converting the fluid properties from compositional three-dimensional distribution into PVT tables in preparation to initialize the equivalent black oil model. The equivalent black oil model produces similar results as compositional model and same run time as black oil, thereby achieving the results of a compositional model without the computational expense.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method of determining an equivalent black oil model of a reservoir, the method comprising:
executing a compositional model to obtain three-dimensional pressure-volume-temperature (PVT) properties;
extracting original fluid in place and reservoir performance characteristics from the three-dimensional PVT properties, wherein the three-dimensional PVT properties are generated by:
  extracting a plurality of fluid samples from a plurality of depths of the reservoir;
  generating a plurality of trend equations for a plurality of components varying with depth of the reservoir;
  initializing the compositional model with at least the plurality of trend equations and an Equation of State model calibrated from properties of the plurality of fluid samples;
  calculating viscosity parameters from the Equation of State model; and
  adjusting parameters of the Equation of State model to correlate calculated viscosity from the Equation of State model with measured viscosity of the plurality of fluid samples by modifying critical volume of C35+ components;
storing the three-dimensional PVT properties as a two-dimensional PVT table;
storing one or more grouped PVT property tables, wherein each grouped PVT property table corresponds with an area of the reservoir having similar PVT properties of the two-dimensional PVT table;
inputting the one or more grouped PVT property tables into a black oil model;
executing the black oil model to obtain estimated fluid in place and estimated reservoir performance characteristics; and
when an equivalency metric is satisfied, storing the black oil model as the equivalent black oil model, wherein the equivalency metric is satisfied when the estimated fluid in place is within defined limits of the original fluid in place, and the estimated reservoir performance characteristics are within defined limits of the reservoir performance characteristics;
when the equivalency metric is not satisfied, storing one or more re-grouped PVT property tables, inputting the one or more re-grouped PVT property tables into the black oil model, and executing the black oil model to obtain updated estimated fluid in place and updated estimated reservoir performance characteristics such that the equivalency metric is satisfied; and
controlling one or more valves of one or more wells within the reservoir according to the equivalent black oil model, accounting for composition changes and variations in fluid mobilities and in driving mechanisms.

2. The method of claim 1, wherein the plurality of trend equations provide a composition grading relationship with respect to depth of the reservoir.

3. The method of claim 1, wherein the correlating of the calculated viscosity and the measured viscosity is performed by Lorenz-Bray-Clark correlation.

4. The method of claim 1, wherein:
extracting the original fluid in place comprises executing the compositional model with zero production to calculate equivalent black oil PVT properties;
the original fluid in place is extracted from the equivalent black oil PVT properties;
extracting the reservoir performance characteristics comprises executing the compositional model over an extended period under a pressure depletion strategy to generate a plurality of production profiles and PVT property variations over a range of pressures; and
the reservoir performance characteristics are calculated from the plurality of production profiles and the PVT property variations.

5. A method of determining an equivalent black oil model of a reservoir, the method comprising:
extracting a plurality of fluid samples from a plurality of depths of the reservoir;
storing three-dimensional pressure-volume-temperature (PVT) properties outputted by a compositional model initialized with at least a plurality of trend equations and an Equation of State model calibrated from properties of the plurality of fluid samples;
calculating viscosity parameters from the Equation of State model;
adjusting parameters of the Equation of State model to correlate calculated viscosity of the Equation of State model with measured viscosity of the plurality of fluid samples by modifying critical volume of C35+ components;
extracting original fluid in place and reservoir performance characteristics from the three-dimensional PVT properties;
storing the three-dimensional PVT properties as a two-dimensional PVT table;
storing one or more grouped PVT property tables, wherein each grouped PVT property table corresponds with an area of the reservoir having similar PVT properties of the two-dimensional PVT table;
inputting the one or more grouped PVT property tables into a black oil model;
executing the black oil model to obtain estimated fluid in place and estimated reservoir performance characteristics;
when an equivalency metric is satisfied, storing the black oil model as the equivalent black oil model, wherein the equivalency metric is satisfied when the estimated fluid in place is within defined limits of the original fluid in place, and the estimated reservoir performance characteristics are within defined limits of the reservoir performance characteristics;
when the equivalency metric is not satisfied, re-grouping the one or more grouped PVT property tables, initializing the black oil model with re-grouped one or grouped PVT property tables, and executing the black oil model to obtain updated estimated fluid in place and updated estimated reservoir performance characteristics such that the equivalency metric is satisfied; and
controlling one or more valves of one or more wells within the reservoir according to the equivalent black oil model, accounting for composition changes and variations in fluid mobilities and in driving mechanisms.

6. The method of claim 5, wherein the plurality of trend equations provide a composition grading relationship with respect to depth of the reservoir.

7. The method of claim 5, wherein the correlating of the calculated viscosity and the measured viscosity is performed by Lorenz-Bray-Clark correlation.

8. The method of claim 5, wherein:
extracting the original fluid in place comprises executing the compositional model with zero production to calculate equivalent black oil PVT properties;
the original fluid in place is extracted from the equivalent black oil PVT properties;
extracting the reservoir performance characteristics comprises executing the compositional model over an extended period under a pressure depletion strategy to generate a plurality of production profiles and PVT property variations over a range of pressures; and
the reservoir performance characteristics are extracted from the plurality of production profiles and the PVT property variations.

9. A system of determining an equivalent black oil model of a reservoir comprising:
one or more processors;
a non-transitory computer-readable memory storing instructions that, when executed by the one or more processors, cause the one or more processors to:
execute a compositional model to obtain three-dimensional pressure-volume-temperature (PVT) properties extract original fluid in place and reservoir performance characteristics from the three-dimensional PVT properties;
extract a plurality of fluid samples from a plurality of depths of the reservoir;
generate a plurality of trend equations for a plurality of components varying with depth of the reservoir;
initialize the compositional model with at least the plurality of trend equations and an Equation of State model calibrated from properties of the plurality of fluid samples;
extract viscosity parameters from the Equation of State model;
adjust parameters of the Equation of State model to correlate calculated viscosity of the Equation of State model with measured viscosity of the plurality of fluid samples by modifying critical volume of C35+ components;
store the three-dimensional PVT properties as a two-dimensional PVT table;
store one or more grouped PVT property tables, wherein each grouped PVT property table corresponds with an area of the reservoir having similar PVT properties of the two-dimensional PVT table;
inputting the one or more grouped PVT property tables into a black oil model;
executing the black oil model to obtain estimated fluid in place and estimated reservoir performance characteristics; and
when an equivalency metric is satisfied, store the black oil model as the equivalent black oil model, wherein the equivalency metric is satisfied when the estimated fluid in place is within defined limits of the original fluid in place, and the estimated reservoir performance characteristics are within defined limits of the reservoir performance characteristics;
when the equivalency metric is not satisfied, store one or more re-grouped PVT property tables, input the one or more re-grouped PVT property tables into the black oil model, and execute the black oil model to obtain updated estimated fluid in place and updated estimated reservoir performance characteristics such that the equivalency metric is satisfied; and
control one or more valves of one or more wells within the reservoir according to the equivalent black oil model, accounting for composition changes and variations in fluid mobilities and in driving mechanisms.

10. The system of claim 9, wherein the plurality of trend equations provide a composition grading relationship with respect to depth of the reservoir.

11. The system of claim 9, wherein:
the original fluid in place is extracted by executing the compositional model with zero production to calculate equivalent black oil PVT properties;
the original fluid in place is extracted from the equivalent black oil PVT properties;
the reservoir performance characteristics is extracted by executing the compositional model over an extended period under a pressure depletion strategy to generate a plurality of production profiles and PVT property variations over a range of pressures; and
the reservoir performance characteristics are extracted from the plurality of production profiles and the PVT property variations.

12. The method of claim 1, wherein the reservoir performance characteristics are extracted form:
the production profiles with time comprising rates and volumes of oil, gas, and water; and
the PVT properties variations with pressure comprising saturation pressure, solution gas oil ratio for oil zone, oil gas ratio for the gas zone, formation volume factor, phase viscosities, oil compressibility, oil viscosibility and combinations thereof.

13. The method of claim 1, wherein storing the three-dimensional PVT properties as a two-dimensional PVT table comprises:
creating groups within the reservoir based on similar PVT properties;
grouping three-dimensional PVT properties generated by similar PVT regions; and
correcting compositional variation within each PVT group using the PVT properties.

14. The method of claim 13, further comprising:
dividing the reservoir into areas by similar PVT properties.

15. The method of claim 5, wherein the reservoir performance characteristics are extracted form:
the production profiles with time comprising rates and volumes of oil, gas, and water; and
the PVT properties variations with pressure comprising saturation pressure, solution gas oil ratio for oil zone, oil gas ratio for the gas zone, formation volume factor, phase viscosities, oil compressibility, oil viscosibility and combinations thereof.

16. The method of claim 5, wherein storing the three-dimensional PVT properties as a two-dimensional PVT table comprises:
creating groups within the reservoir based on similar PVT properties;
grouping three-dimensional PVT properties generated by similar PVT regions;

establishing, within each PVT region, a relationship of PVT properties versus depth; and correcting compositional variation within each PVT group using the PVT properties.

17. The system of claim 9, wherein the instructions further cause the one or more processors to:

create groups within the reservoir based on similar PVT properties;

group three-dimensional PVT properties generated by similar PVT regions;

establish, within each PVT region, a relationship of PVT properties versus depth; and correct compositional variation within each PVT group using the PVT properties.

* * * * *

UNITED STATES PATENT AND TRADEMARK OFFICE
CERTIFICATE OF CORRECTION

PATENT NO. : 12,282,131 B2
APPLICATION NO. : 17/335751
DATED : April 22, 2025
INVENTOR(S) : Rahmouni et al.

Page 1 of 1

It is certified that error appears in the above-identified patent and that said Letters Patent is hereby corrected as shown below:

In the Claims

Claim 12, Column 14, Line 32, "extracted form:" should read --extracted from:--; and
Claim 15, Column 14, Line 53, "extracted form:" should read --extracted from:--.

Signed and Sealed this
Seventeenth Day of June, 2025

Coke Morgan Stewart
*Acting Director of the United States Patent and Trademark Office*